UNITED STATES PATENT OFFICE.

WILLIAM BRÜCKNER, OF SAN FRANCISCO, CALIFORNIA.

IMPROVED PROCESS FOR REFINING AMALGAM.

Specification forming part of Letters Patent No. 46,875, dated March 21, 1865.

*To all whom it may concern:*

Be it known that I, WILLIAM BRÜCKNER, of the city and county of San Francisco, State of California, have discovered a new and Improved Process for Refining Amalgam of Gold and Silver, called "Brückner's Process for Refining Amalgam;" and I do hereby declare that the within is a full and exact description of the process for effecting the same.

The nature of my invention consists in providing a process by which the baser metals and minerals—such as lead, zinc, copper, iron, antimony, arsenic, tin, cobalt, nickel, or other base metals—can be easily extracted before retorting without roasting, leaving the amalgam chemically pure, or sufficiently pure for coinage.

Most ores render an impure amalgam. The impurity can be best ascertained after the first discharge by taking a sample of about ten grains of amalgam, which is heated to red heat by fire under draft, in order to get rid of quicksilver. This sample thus retorted must be examined under the blow-pipe. If there should be found other metals in it but iron, the old process of roasting is resorted to. If the ore is of such a nature that a great deal of lead enters the amalgam, the metal must be refined, and in this case the calculation will show whether there is more economy in working the ore without roasting, even if more silver be lost. Generally, if in treating ore of about one hundred ounces per ton by means of roasting not more than ten per cent. of silver were saved, it would not pay to roast; but in all cases where roasting is resorted to more or less silver is lost.

By my process the necessity of roasting ores before amalgamating is done away with.

To enable others skilled in the art to make use of my discovery, I will proceed to describe the process and its operation.

My process for purifying amalgam is by means of bichloride of copper in the wet way. In order to obtain this bichloride of copper by a cheap process, copper ores or other substances containing copper are pulverized and roasted in a roasting-furnace, together with iron pyrites and salt, in the proportion of six hundred pounds copper ore with sixty pounds pyrites and one hundred pounds of salt. By this roasting I obtain sulphate of copper, which is decomposed by the salt and converted into bichloride, with the simultaneous production of sulphate of soda. One thousand pounds of this roasted ore and about three hundred pounds of water are to be added and placed in a common amalgamating-barrel and driven by a wheel at the rate of twenty revolutions per minute. The barrel should be about two-thirds full, and is kept revolving about one hour, or until the roasted copper ore and water contained in the barrel are formed into a uniform paste. I then place one thousand pounds of the impure amalgam into the barrel and again start it, keeping it constantly revolving for twelve hours at the rate of sixteen revolutions per minute. During this time the foreign metals are precipitated out of the amalgam, and only silver and gold remain, perfectly purified, in combination with the quicksilver. As soon as all of the foreign metals are separated from the residuary copper ore, which may be accomplished after being collected in a cistern and dried, and the same process of roasting with pyrites and salt, it can be used again, and so on until it is completely exhausted. The pure amalgam G is separated by washing and straining in a bag in the usual way, and will, after being retorted, leave an alloy of fine silver and gold. For the same purpose of refining may be used bichloride of copper, which is obtained by the usual way of dissolving copper in a compound of nitric and muriatic acids, or by dissolving sulphate of copper (blue vitriol) together with salt. About ten pounds of this bichloride is to be dissolved in thirty pounds of water and boiled by steam, together with one hundred pounds of impure amalgam, B, till all of the base metals are separated, when the pure amalgam is washed and strained, as above described.

Having thus described my discovery, what I claim, and desire to secure by Letters Patent, is—

The application and use of bichloride of copper, or its equivalent, together with iron pyrites and salt, without reference to the exact proportions of each ingredient, in the manner and for the purpose herein described.

W. BRÜCKNER.

Witnesses:
C. W. M. SMITH,
W. O. ANDREWS.